(12) United States Patent
Yamada et al.

(10) Patent No.: US 8,064,302 B2
(45) Date of Patent: Nov. 22, 2011

(54) OPTICAL DISK DRAWING APPARATUS, HOST COMPUTER, AND OPTICAL DISK DRAWING METHOD

(75) Inventors: Seiya Yamada, Hamamatsu (JP); Hisanori Itoga, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 642 days.

(21) Appl. No.: 11/962,613

(22) Filed: Dec. 21, 2007

(65) Prior Publication Data

US 2008/0151738 A1 Jun. 26, 2008

(30) Foreign Application Priority Data

Dec. 25, 2006 (JP) ................. 2006-348219

(51) Int. Cl.
 *G11B 7/004* (2006.01)
(52) U.S. Cl. ........................ 369/47.5; 369/94
(58) Field of Classification Search .................. 369/116, 369/53.26, 47.5, 47.51, 283, 94, 286, 44.26, 369/44.11; 347/224, 225, 262
See application file for complete search history.

(56) References Cited

U.S. PATENT DOCUMENTS

| | | | |
|---|---|---|---|
| 2003/0072908 A1 | 4/2003 | Anderson | |
| 2003/0231561 A1* | 12/2003 | Morishima | 369/44.26 |
| 2004/0037176 A1* | 2/2004 | Morishima | 369/44.26 |
| 2004/0136291 A1* | 7/2004 | Hayashi | 369/53.2 |
| 2004/0141445 A1* | 7/2004 | Hanks | 369/53.29 |
| 2005/0121416 A1* | 6/2005 | Morishima et al. | 216/54 |
| 2005/0265158 A1* | 12/2005 | Minamimoto et al. | 369/47.1 |
| 2006/0013092 A1* | 1/2006 | Lee et al. | 369/53.1 |

FOREIGN PATENT DOCUMENTS

| | | |
|---|---|---|
| EP | 1 274 084 A2 | 1/2003 |
| EP | 1 482 489 A2 | 12/2004 |
| JP | 2003-16649 A | 1/2003 |
| JP | 2005-108354 A | 4/2005 |
| JP | 2006-155812 A | 6/2006 |

OTHER PUBLICATIONS

Japanese Office Action dated Dec. 24, 2008 with English translation (seven (7) pages).
European Search Report dated Feb. 2, 2009 (nine (9) pages).

* cited by examiner

*Primary Examiner* — Wayne Young
*Assistant Examiner* — Thomas Alunkal
(74) *Attorney, Agent, or Firm* — Crowell & Moring LLP

(57) ABSTRACT

A drawing pulse generating unit of an optical disk recording apparatus judges a bit stream of main data contained in a bit stream signal of frame-formatted data, and generates pulse signals DOTX 1 and DOTX 2 based upon the judgment, and then, outputs the generated pulse signals DOTX 1 and DOTX 2 to the gate circuit. In a time period during which a signal level of the pulse signal DOTX 1 is an "H" level, the gate circuit supplies a bit stream signal of the frame-formatted data to a laser driver. In a time period during which a signal level of the pulse signal DOTX 1 is an "L" level, the gate circuit supplies a bit stream signal indicative of an erase level to the laser driver. The laser driver controls an optical pickup so that a laser light having strength indicative of the bit stream signal is irradiated.

7 Claims, 11 Drawing Sheets

OPTICAL DISK DRAWING APPARATUS, HOST COMPUTER, AND OPTICAL DISK DRAWING METHOD

BACKGROUND OF THE INVENTION

The present invention is related to a technique for drawing on an optical disk.

Among optical disks such as CD-R (Compact Disk-Recordable), CD-RW (Compact Disk-Rewritable), and DVD-R (Digital Versatile Disk-Recordable), since contents of recorded data cannot be discriminated from each other by human eyes, it is practically difficult to discriminate the respective optical disks from each other based upon outer appearances of these optical disks if labels are not attached, but also labels are not printed thereon. As a consequence, the following technical ideas have been proposed: That is, since characters, symbols, or figures/pictures are drawn on optical disks, these optical disks can be simply discriminated from each other based upon the outer appearances thereof. Also, technical ideas capable of rewriting images drawn on optical disks have been proposed. For instance, JP-A-2006-155812 has proposed such a technique that after an image drawn on an optical disk is once erased, the image is again drawn. Also, JP-A-2003-16649 has described another technique capable of performing a gradation representation of an image based upon dimensions of bits and duty ratios.

However, in the technique described in JP-A-2006-155812, after the existing image is erased, a new image is formed. As a result, there is such a problem that a lengthy time is required in order to form the image. Also, in the technique described in JP-A-2003-16649, the gradation representation is determined based upon the dimensions of the bits, or the duty ratios. As a result, assuming now that a direct overwriting operation is carried out, there is such a problem that erasing remainders occur, so that the gradation is disturbed.

SUMMARY OF THE INVENTION

The present invention has been made to solve the above-described background problems, and therefore, has an object to provide a technical idea capable of rewriting an image with respect to an optical disk in a higher speed, and further, a higher grade, as compared with those of the conventional techniques.

In order to achieve the object, the present invention provides the following arrangement.

(1) An optical disk drawing apparatus comprising:
a receiver that receives pixel data of an image to be drawn on an optical disk;
an image data generator that generates image data by frame-formatting the received pixel data;
a drive signal generator that generates a drive signal indicative of irradiation timing for any one of a write level, an erase level, and a read level based upon the generated image data;
an image data identifying unit that identifies a first control signal indicative of a gradation degree for every pixel contained in that image data;
a first time period specifying unit that specifies a time period for irradiating the laser light of the erase level as a first time period based upon the identified first control signal;
a gate unit that supplies the drive signal indicative of the erase level within the specified first time period, and supplies the drive signal generated in a time period other than the specified first time period; and
a laser irradiating unit that irradiates laser light at the timing indicative of the supplied drive signal.

(2) The optical disk drawing apparatus according to (1), wherein
the image data contains a second control signal which indicates a mode difference of gradation degrees for every pixels between an image indicative of the image data and a predetermined image,
the image data identifying unit identifies the second control signal,
the optical disk drawing apparatus further comprises a second time period specifying unit that specifies a time period during which a rewriting operation is not performed based upon the identified second control signal as a second time period,
the gate unit supplies the drive signal indicative of the read level to the laser light irradiating unit within the specified second time period,
the gate unit supplies the drive signal indicative of the erase level to the laser light irradiating unit within a time period which is defined by a time period other than the second time period and is involved in the first time period, and
the gate unit supplies the generated drive signal within a time period which is defined by a time period other than the second time period and other than the first time period.

(3) The optical disk drawing apparatus according to (2), wherein
the second control signal is made up of at least one bit stream signal indicative of strength of the erase level within 1 frame, and a bit stream signal indicative of the strength of the read level; and
the gate unit supplies a drive signal indicative of the erase level to the laser light irradiating unit within a time period other than the specified second time period.

(4) A host computer comprising:
a first image data acquiring unit that acquires first image data indicative of an image to be drawn on an optical disk;
a second image data acquiring unit that acquires second image data indicative of an image which has been drawn on the optical disk;
a first control signal generator that generates a first control signal for every pixel, the first control signal representing a gradation degree of each pixel of the first image data acquired by the first image data acquiring unit;
a second control signal generator that compares the acquired first image data with the acquired second image data pixel by pixel so as to generate a second control signal indicative of a mode difference of gradation degrees for every pixel; and
an output that outputs the first image data in which the generated first control signal and the generated second control signal are contained.

(5) An optical disk drawing method comprising:
receiving pixel data of an image to be drawn on an optical disk;
generating image data by frame-formatting the received pixel data;
generating a drive signal indicative of irradiation timing for any one of a write level, an erase level, and a read level based upon the generated image data;
identifying a first control signal indicative of a gradation degree every pixel contained in that image data;
specifying a time period for irradiating the laser light of the erase level as a first time period based upon the identified first control signal;
supplying, to a laser irradiating unit, the drive signal indicative of the erase level within the specified first time period, and supplies the drive signal generated in a time period other than the specified first time period; and irradiating laser light at the timing indicative of the supplied drive signal by the laser irradiating unit.

(6) The method according to (5), wherein the image data contains a second control signal which indicates a mode difference of gradation degrees for every pixels between an image indicative of the image data and a predetermined image, and the method further comprises:

identifying the second control signal, specifying a time period during which a rewriting operation is not performed based upon the identified second control signal as a second time period, supplying, to the laser irradiating unit, the drive signal indicative of the read level to the laser light irradiating unit within the specified second time period, supplying, to the laser irradiating unit, the drive signal indicative of the erase level to the laser light irradiating unit within a time period which is defined by a time period other than the second time period and is involved in the first time period, and supplying, to the laser irradiating unit, the generated drive signal within a time period which is defined by a time period other than the second time period and other than the first time period.

(7) The method according to (6), wherein the second control signal is made up of at least one bit stream signal indicative of strength of the erase level within 1 frame, and a bit stream signal indicative of the strength of the read level; and a drive signal indicative of the erase level is supplied to the laser light irradiating unit within a time period other than the specified second time period.

(8) The method according to (6) further comprising:

acquiring first image data indicative of the image to be drawn on the optical disk;

acquiring second image data indicative of an image which has been drawn on the optical disk;

generating the first control signal for every pixel, the first control signal representing a gradation degree of each pixel of the acquired first image data;

comparing the acquired first image data acquiring unit with the acquired second image data pixel by pixel so as to generate the second control signal; and an output that outputs the first image data in which the generated first control signal and generated the second control signal are contained.

In accordance with the present invention, it is possible to rewrite the image with respect to the optical disk in the higher speed, and further, the higher grade, as compared with those of the conventional techniques.

DETAILED DESCRIPTION OF PREFERRED EMBODIMENTS

An optical disk recording apparatus 1 according to an embodiment of the present invention has a function (data recording/regenerating function) capable of recording and/or regenerating data, for instance, music data with respect to an optical disk; and another function (drawing function) capable of drawing an image on this optical disk, which can be visually recognized by a user. In the below-mentioned description, first of all, a description is made of a structure of an optical disk itself, and thereafter, a description is made of an optical disk recording apparatus 1.

(1) First Embodiment (1-1) Structure (1-1-1) Structure of Optical Disk

Figure 1:
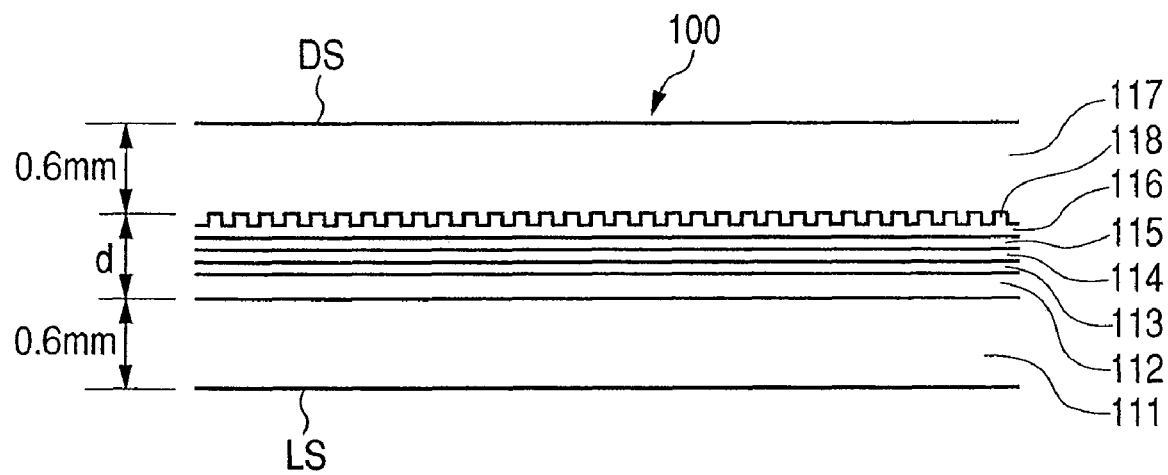
FIG. 1 is a sectional view for showing an optical disk according to a first embodiment of the present invention.

FIG. 1 shows a sectional view of an optical disk 100 according to a first embodiment of the present invention. The optical disk 100 can be, for instance, a DVD-RW, a CD-RW, and a CD-RW/DVD-RW mixing type optical disk. As indicated in FIG. 1, in the optical disk 100, a polycarbonate layer 111, a drawing layer 112, a reflection layer 113, an adhesive layer 114, another reflection layer 115, a data recording layer 116, and another polycarbonate layer 117 are sequentially arranged from a label surface "LS" thereof to a recording surface "DS" thereof. While a thickness of the optical disk 100 is approximately 1.2 mm, this entire thickness is occupied by the polycarbonate layer 111 having approximately 0.6 mm and another polycarbonate layer 117 having also approximately 0.6 mm, so that a thickness "d" measured from the drawing layer 112 up to the data recording layer 116 is a very short distance, as compared with the entire thickness of approximately 1.2 mm. A helical-shaped groove (guide groove) 118 is formed on the side of the recording surface "DS" of the data recording layer 116.

The drawing layer 112 and the data recording layer 116 are such layers which are formed by phase changing materials having thermal reversibility. A phase changing material has such a nature that when a temperature of this phase changing material reaches a temperature point higher than, or equal to a melting point, and if this phase changing material is rapidly cooled, then the phase changing material becomes a non-crystallized status, and also, if the phase changing material is gradually cooled at a temperature lower than, or equal to the melting point, then the phase changing material is returned to the original crystallized status. In such a rewritable type optical disk such as a CD-RW and a DVD-RW data can be regenerated by utilizing a difference between reflectance factors of these non-crystallized/crystallized statuses, and data can be rewritten by utilizing reversibility. When laser light having strength higher than, or equal to a predetermined strength is irradiated onto the drawing layer 112, a phase changing material of a region where the laser light is irradiated is brought into a non-crystallized status, and thus, such an image which can be visually recognized by a user is formed based upon this non-crystallized region and a region having a crystallized status. On the other hand, since laser light having a very low strength is irradiated onto the above-described drawing layer 112 so as to increase the temperature thereof, and thereafter, the drawing layer 112 is gradually cooled, the non-crystallized region is returned to the region having the crystallized status, so that the image may be erased. Similarly, when data is recorded, the data recording operation is carried out along the groove 118. In the case that the recorded data is read out, such a laser light having strength lower than the predetermined strength which is lower the strength for the data recording operation is irradiated onto the grove 118, and then, strength of reflection light thereof is sensed so as to read out the data. In the below-mentioned descriptions, a level of such a laser light by which the phase changing materials of the drawing layer 112 and the data recording layer 116 are non-crystallized will be referred to as a "write level". A level of another laser light by which the phase changing materials are returned from the non-crystallized status to the crystallized status will be referred to as an "erase level". Further, a level of laser light for reading out data will be referred as a "read level."

(1-1-2) Entire Arrangement of System

Figure 2:
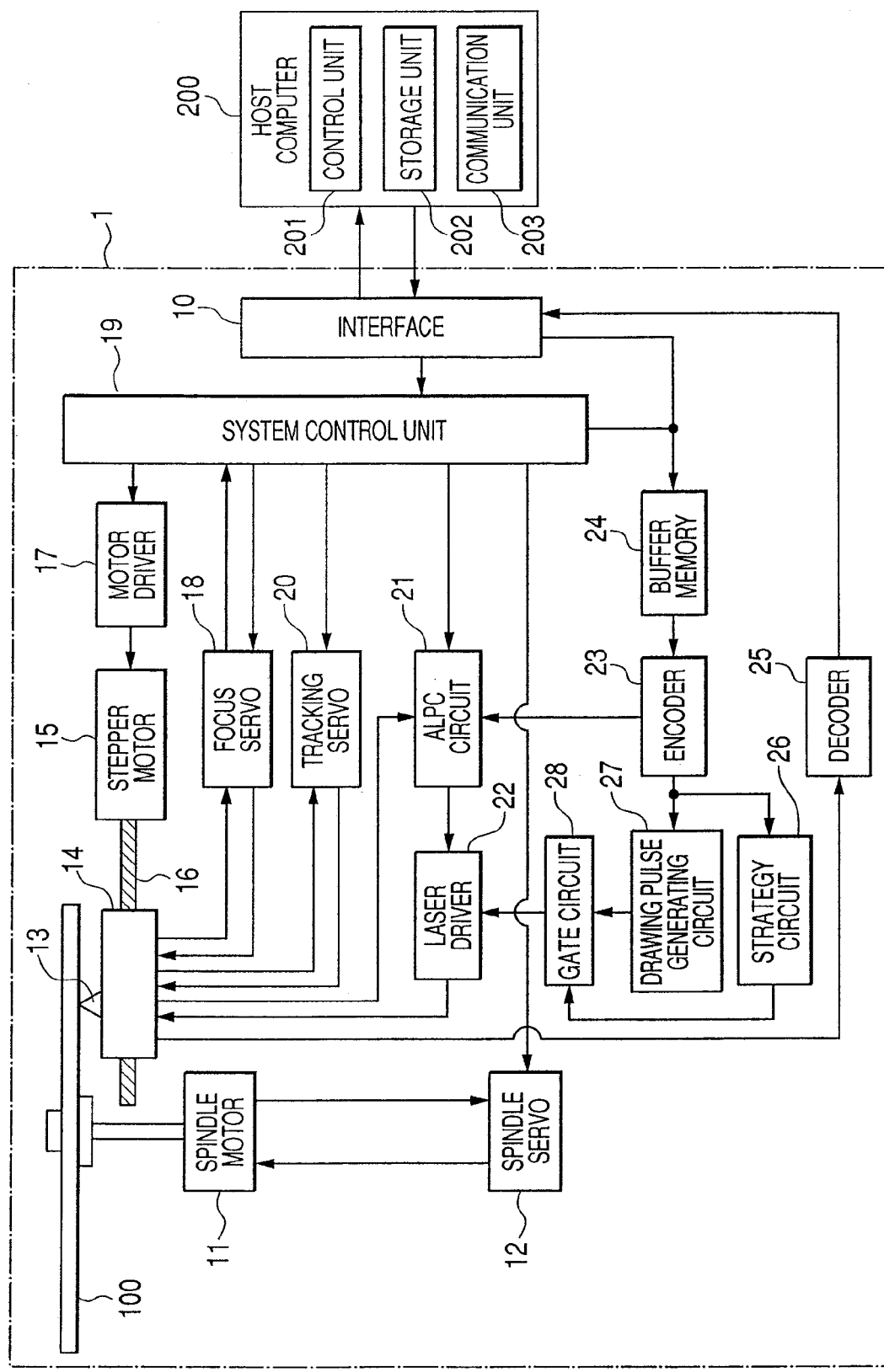
FIG. 2 is a diagram for representing an arrangement of an entire system related to the first embodiment.

As represented in FIG. 2, a system, related to the present first embodiment, is arranged by connecting a host computer 200 with the optical disk recording apparatus 1 under such a condition that the host computer 200 is communicatable with the optical disk recording apparatus 1. The optical disk recording apparatus 1 may be built in the host computer 200, or maybe alternatively provided outside the host computer 200.

The optical disk 100 is mounted on the optical disk recording apparatus 1. In the optical disk recording apparatus 1, the optical disk 100 is rotated by a spindle motor 11. A spindle servo 12 controls rotations of the spindle motor 11 in such a manner that a linear velocity is made constant (namely, CLV control) when both a recording operation and a regenerating operation are carried out, whereas a rotation number thereof is made constant (namely, CAV control) when a drawing operation is carried out. An optical pickup 14 (optical head) is transported by a feeding mechanism 16 along a radial direction (right and left directions, as viewed in this drawing) of the optical disk 100. The feeding mechanism 16 is constructed of a feeding screw and the like, which is driven by a stepper motor 15. A motor driver 17 drives the stepper motor 15 in response to an instruction of a system control unit 19. A focus servo 18 performs focus control operations of the optical pickup 14 when a data recording operation, a data regenerating operation, and a drawing operation are carried out. The system control unit 19 controls respective units of the entire system, and outputs various sorts of clock signals in accordance with programs stored in a memory (not shown) provided inside this system control unit 19. A tracking servo 20 performs a tracking servo control of the optical pickup 14 when the data recording operation and the data regenerating operation are carried out. It should be noted that the tracking servo control is turned off when the drawing operation is carried out. An ALPC (Automatic Laser Power Control) circuit 21 controls strength of laser light when a laser diode of the optical pickup 14 while the data recording operation, the data regenerating operation, and the drawing operation are carried out.

Recording data is inputted to an encoder 23 during data recording operation. On the other hand, image data indicative of an image to be drawn on the optical disk 100 is inputted during image drawing operation, while the image data contains gradation data (first control signal) indicative of a gradation degree as to each of pixels of this image. The encoder 23 encodes the recording data and the image data to generate formats in response to the type of the optical disk 100. Various sorts of clock signals are supplied from the system control unit 19 to the encoder 23 in order to execute a frame-formatting operation. The data encoded by the encoder 23 is outputted in response to a clock signal supplied from the system control unit 19.

A strategy circuit 26 performs a time axis correcting process operation with respect to either the encoded recording data, or the image data so as to output a write-series control signal and an erase-series control signal. The write-series control signal is employed so as to control irradiation of the laser light having the write level. The erase-series control signal is employed so as to control irradiation of the laser light having the erase level. In other words, during the drawing operation, the strategy circuit 26 generates such a drive signal indicative of any one of the irradiation levels (namely, erase level, write level, and read level) based upon the image data supplied from the encoder 23.

A drawing pulse generating unit 27 outputs signals having "H" levels in a continuous manner when a data recording operation or a data regenerating operation is carried out. On the other hand, when a drawing operation is performed, the drawing pulse generating unit 27 generates a pulse signal (drawing signal) whose duty ratio is changed in response to gradation data of pixels which constitute image data.

When the data recording operation or the data regenerating operation is carried out, a gate circuit 28 directly passes therethrough both the write-series control signal and the erase-series control signal, which are outputted from the strategy circuit 26, and then, supplies these write-series control signal and erase-series control signal to a laser driver 22. On the other hand, when the drawing operation is carried out, the gate circuit 28 gate-processes both the write-series control signal and the read-series control signal, which are outputted from the strategy circuit 26, by employing a pulse signal outputted from the drawing pulse generating unit 27.

A laser driver 22 controls laser power to obtain instructed values respectively when the data recording operation, the data regenerating operation, and the drawing operation are carried out. When the data recording operation is carried out, the laser driver 22 modulates the laser light in response to such a drive signal which is generated based upon recording data and is outputted from the gate circuit 28, and then, records the modulated laser light on a data recording layer of the optical disk 100. On the other hand, when the drawing operation is carried out, the laser driver 22 modulates the laser light in response to the drive signal which is gate-processed by the drawing pulse signal whose duty ratio is changed, and changes a visual light characteristic of a drawing layer 112 of the optical disk 100 so as to perform the drawing operation based upon monochromatic multi-gradation. A decoder 25 EFM-demodulates a light reception signal in response to return light which is received by the optical pickup 14 when the data regenerating operation is performed, so that the decoder 25 executes a data regenerating operation.

The host computer 200 is equipped with a control unit 201 provided with a CPU (Central Processing Unit) and the like; a storage unit 202 which stores thereinto a computer program to be executed by the control unit 201, and the like; and also, a communication unit 203 provided in order to transmit and/or receive data with respect to the optical disk recording apparatus 1. When a data recording operation, a data regenerating operation, and a drawing operation are carried out, the host computer 200 transmits an instruction issued from an operator to the optical disk recording apparatus 1. The instruction is transmitted via an interface 10 to the system control unit 19. The system control unit 19 transmits various commands corresponding to the transmitted instruction to various circuits employed in the optical disk recording apparatus 1 in order to execute the relevant operations by these circuits. For example, when the data recording operation is carried out, the host computer 200 transmits recording data to the optical disk recording apparatus 1. This recording data is received by the interface 10 of the optical disk recording apparatus 1, and then, is written in a buffer memory 24 by the system control unit 19. Then, the system control unit 19 reads out the recording data from the buffer memory 24 so as to supply the read recording data to the encoder 23. Also, when the data regenerating operation is carried out, data regenerated by the decoder 25 is transferred via the interface 10 to the host computer 200. On the other hand, when the drawing operation is carried out, the host computer 200 transmits the image data to the optical disk recording apparatus 1. This image data is received by the interface 10, and then, is written in the buffer memory 24 by the system control unit 19. The system control unit 19 reads out the image from the buffer memory 24 so as to supply the read image data to the encoder 23.

(1-1-3) Peripheral Circuit Arrangement as to Gate Circuit 28

Figure 3:
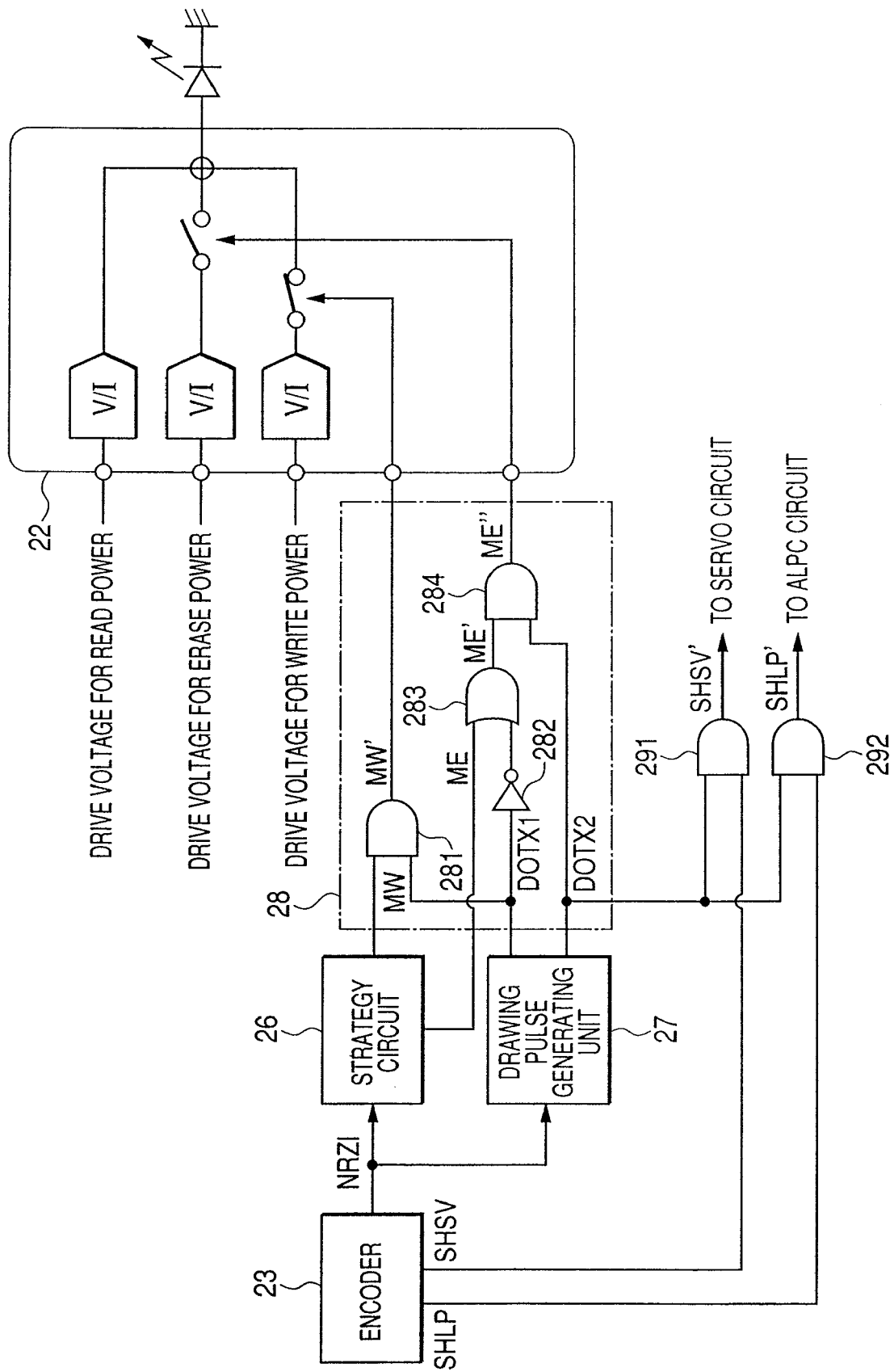
FIG. 3 is a schematic diagram for showing a structure of a peripheral circuit arrangement of a gate circuit shown in FIG. 2.

FIG. 3 is a diagram for showing a circuit arrangement provided at a peripheral portion of the gate circuit 28. In FIG. 3, when a data recording operation is carried out, the encoder 23 performs an interleaving process operation with respect to the recording data, and thereafter, EFM-modulates the interleaved recording data, and furthermore, performs a synchronizing process operation, an adding process operation of parity data and a margin bit, and also, an NRZI (NonReturn to Zero Invert) inverting process operation with respect to the EFM-modulated recording data in order that a plurality of unit data made of a predetermined data amount are collected so as to form a frame data, so that the encoder 23 continuously generates a recording signal which constitutes 1 EFM frame. The encoder 23 supplies the formed recording signal to both the strategy circuit 26 and the drawing pulse generating unit 27. The recording signal formed by the encoder 23 is converted into a drive signal MW for write power and a drive signal ME for erase power by the strategy circuit 26, and then, the drive signal MW for write power and the drive signal ME for erase power are supplied to the laser driver 22. It should also be noted that at this time, the gate circuit 28 directly passes therethrough the write-series control signal MW and the erase-series control signal ME, which are supplied from the strategy circuit 26. As a consequence, both the drive signal MW for write power and the drive signal ME for erase power, which are generated by the strategy circuit 26, are directly supplied to the laser driver 22. In response to the drive signal MW for write power and the drive signal ME for erase power, the laser driver 22 drives the optical pickup 14 in order to modulate power of laser light to obtain 3 values (namely, write level, erase level, and read level) of the laser power, and then, the recording signal is recorded on a data recording layer of the optical disk 100. In other words, the laser driver 22 increases the laser power to the write level within a time section during which the signal level of the drive signal MW for write power is an "H" level, and sets the laser power to the erase level within a time section during which the signal level of the drive signal ME for erase power is an "H" level. Also, the laser driver 22 decreases the laser power to the read level within a time section during which the signal levels of both the drive signal MW for write power and the drive signal ME for erase power are "L" levels.

The encoder 23 processes the image data during the drawing operation, while the encoder 23 handles the image data in a similar manner to that of the recording data during the data recording operation. It should also be noted that the encoder 23 may not alternatively perform the interleaving process operation. When the interleaving process operation is not carried out, the encoder 23 directly EFM-modulates the image data without executing the interleaving process operation, and moreover executes a synchronizing process operation, an adding process operation of parity data and a margin bit, and also, an NRZI inverting process operation with respect to the EFM-modulated recording data, so that the encoder 23 continuously forms a recording signal which constitutes 1 EFM frame. In this case, image data of 1 pixel (namely, gradation data indicative of gradation of this pixel) is contained in the data of the 1 EFM frame. In the first embodiment, data of 1 pixel is expressed by a length of 1 EFM frame.

The operations of the drawing pulse generating unit 27 are switched when a data recording operation is carried out and when a drawing operation is carried out. A first description is made of operations of the drawing pulse generating unit 27 during the data recording operation. When the data recording operation is carried out, the drawing pulse generating unit 27 continuously outputs pulse signals "DOTX 1" and "DOTX 2" having "H" levels. The pulse signal "DOTX 1" having the "H" level is entered to one input terminal of an AND gate 281. As a consequence, the output signal of the strategy circuit 26 which is entered to the other input terminal of the AND gate 281 during the data recording operation directly passes through the AND gate 281, namely, the drive signal MW for write power directly passes through this AND gate 281. The pulse signal "DOTX 1" having the "H" level outputted from the drawing pulse generating unit 27 is inverted by a NOT gate 282, and then, the inverted pulse signal DOTX 1 is entered to one input terminal of an OR gate 283. As a consequence, the drive signal ME for erase power directly passes through the OR gate 283, while the drive signal ME for erase power corresponds to the output signal of the strategy circuit 26 which is inputted to the other input terminal of the OR gate 283 during the data recording operation. Also, the pulse signal "DOTX 2" having the "H" level is entered to one input terminal of an AND gate 284. As a consequence, the drive signal ME for erase power, which is entered to the other input terminal of the AND gate 284 during the data recording operation directly passes through the AND gate 284.

As previously explained, both the drive signal MW for erase power and the drive signal ME for erase power, which are outputted from the strategy circuit 26 directly pass through the gate circuit 28 when the data recording operation and the data regenerating operation are carried out.

Next, a description is made of process operations of the drawing pulse generating unit 27 when a drawing operation is carried out. During the drawing operation, the drawing pulse generating unit 27 EFM-demodulates data outputted from the encoder 23 so as to acquire gradation data of 1 pixel with respect to each of pixels as to 1 EFM frame. Then, the drawing pulse generating unit 27 outputs such a pulse signal "DOTX 1" whose time period is equal to 1 EFM frame length, and whose duty ratio is changed in response to gradation data (first control signal) every the acquired pixel. Also, in the first embodiment, the drawing pulse generating unit 27 outputs a pulse signal DOTX 2 having an "H" level in a continuous manner.

The pulse signal DOTX 1 is inputted to one input terminal of the AND gate 281. As a consequence, when the drawing operation is carried out, the AND gate 281 opens the gate thereof only for a time responding to a gradation value of a corresponding pixel every 1 EFM frame period so as to pass the drive signal MW for write power which is entered to the other input terminal only for this time.

Also, the pulse signal DOTX 1 is inverted by the NOT gate 282, and then, the inverted pulse signal DOTX 1 is entered to one input terminal of the OR gate 283. As a consequence, when the drawing operation is carried out, the OR gate 283 opens the gate thereof only for a time responding to a gradation value of a corresponding pixel every 1 EFM frame period so as to pass the drive signal ME for erase power which is entered to the other input terminal only for this time. Also, in a time duration other than the above-described time, the OR gate 283 continuously outputs a signal having an "H" level. Also, since the signal level of the pulse signal DOTX 2 is always the "H" level, which is entered to one input terminal of the AND gate 284, the drive signal ME for erase power which is inputted to the other terminal of the AND gate 284 directly passes through the AND gate 284.

When the drawing operation is carried out, both a drive signal MW for write power' and a drive signal ME for erase power" which are outputted from the gate circuit 28 are supplied as drawing signals to the laser driver 22. In response to these drawing signals MW' and ME", the laser driver 22 drives the optical pickup 14 so as to modulate the power of the laser light to obtain 3 values of the laser power (namely, write level, erase level, and read level), and then, irradiates the modulated laser light onto the drawing layer 112 of the optical disk 100. Concretely speaking, the laser driver 22 increases the laser power to the write level for a time section during which the level of the drive signal MW for write power' is an "H" level; the laser driver 22 increases the laser power to the erase level for a time section during which the level of the drive signal ME for erase power" is an "H" level; and the laser driver 22 decreases the laser power to the read level for a time section during which both the levels of the drive signal MW for write power' and of the drive signal ME for erase power" are "L" levels.

That is to say, in the first embodiment, when the drawing operation is carried out, the drawing pulse generating unit 27 generates the pulse signal DOTX 1 indicative of a time period during which the laser light having the erase level is irradiated in response to the gradation data (first control signal) for each of the pixels contained in the image data outputted from the encoder 23. In the time period (namely, time period other than first time period) during which the signal level of the pulse signal DOTX 1 is the "H" level, the drive signals MW and ME generated in the strategy circuit 26 directly pass through the gate circuit 28 to be supplied to the laser driver 22. On the other hand, in the time period (first time period), the drive signal indicative of the erase level is supplied to the laser driver 22.

In this case, since a distance along the circumferential direction on the optical disk 100 (namely, length along circumferential direction, which is allocated in order to draw 1 pixel) which corresponds to 1 EFM frame length is very short, a single drawn pixel may be viewed as a single dot by human eyes. The higher the duty ratio is increased, the lighter the drawn image is felt with respect to human eyes. In accordance with the above-described manner, the gradation can be represented on the image formed in the drawing layer 112 of the optical disk 100.

The encoder 23 outputs a sampling pulse "SHLP" for an erase power servo. In the first embodiment, since the signal level of the pulse signal DOTX 2 is always an "H" level, the outputted sampling pulse SHLP directly passes through the AND gate 291 and is then supplied to the ALPC circuit 21. Also, the encoder 23 outputs another sampling pulse "SHSV" for an actuator servo. The outputted sampling pulse "SHSV" directly passes through the AND gate 292 and is then supplied to a tracking servo 20.

Figure 4:
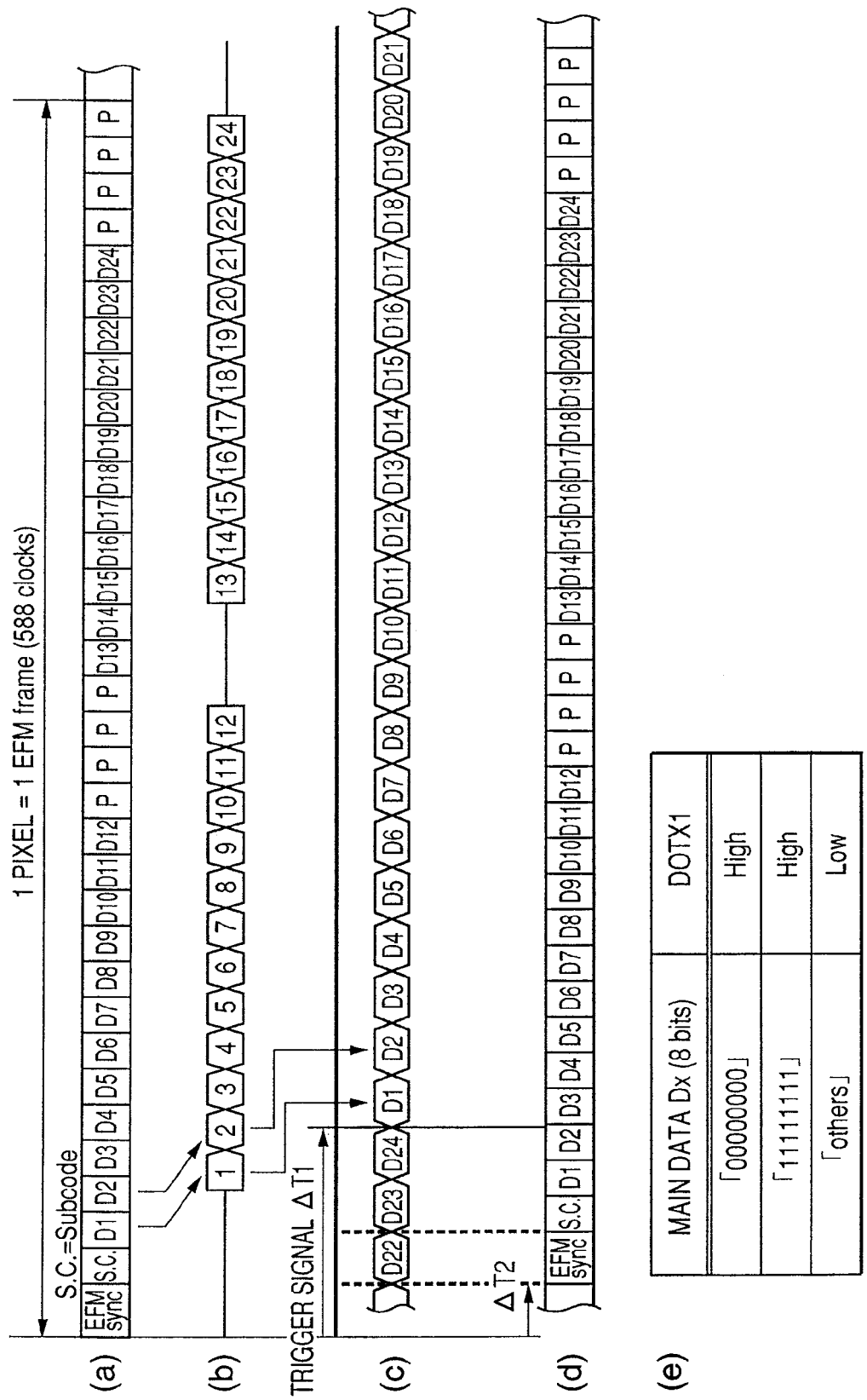
FIG. 4 is a diagram for representing a relationship between a data structure of an EFM frame and pulse signals.
Figure 5:
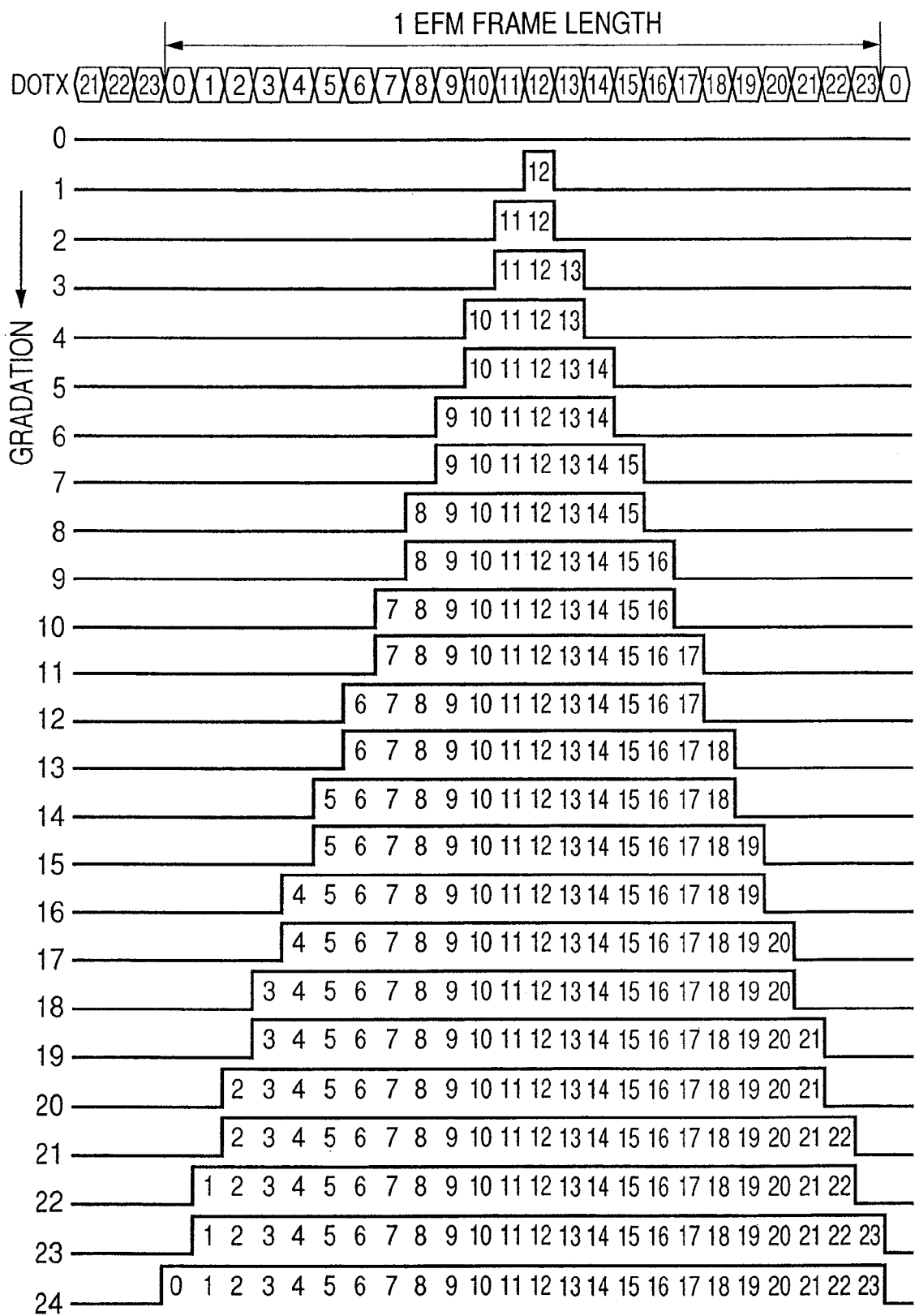
FIG. 5 is a diagram for indicating an example as to waveforms of pulse signals every gradation of 25 stages defined from a zero-th stage to a 24-th stage.

Referring now to FIG. 4 and FIG. 5, a description is made of setting of duty ratios of the pulse signal DOTX 1 which is outputted from the drawing pulse generating unit 27 when the drawing operation is carried out. FIG. 4 is a diagram for indicating a relationship between a data structure of an EFM frame and the pulse signal DOTX 1. (A) of FIG. 4 is a diagram for representing the data structure of the EFM frame. In (A) of FIG. 4, symbol "EFM sync" shows a sync pattern which indicates a section of the EFM frame; symbols "D1" to "D24" show data; and symbol "P" represents a parity. It should be understood that the data structure itself of this EFM frame is identical to each other for a data recording-purpose EFM frame and a drawing-purpose EFM frame. Contents of the data D1 to the data D24 are different from each other with respect to the data recording-purpose EFM frame and the drawing-purpose EFM frame. In other words, the data recording-purpose data D1 to D24 correspond to data indicative of information to be recorded, whereas the drawing-purpose data D1 to D24 correspond to data responding to gradation of 1 pixel allocated to this 1 EFM frame.

(B) of FIG. 4 indicates discrimination results of the data D1 to the data D24. The drawing pulse generating unit 27 discriminates the data D1 to the data D24 from each other in accordance with a predetermined discriminating method. As the discriminating method, for instance, the drawing pulse generating unit 27 may discriminate data "Dx" by referring to, for example, a predetermined bit value contained in the data Dx (symbol "x" indicates natural number of 1 to 24).

(C) of FIG. 4 is a diagram for indicating the pulse signal DOTX 1. The pulse signal DOTX 1 is such a signal that while 1 EFM frame length is equally subdivided by 24 to obtain sections 1 to 24, a signal level of this pulse signal is set to either an "H" level or an "L" level in the unit of this subdivided section (duty ratio is changed from 0 to 100%). In FIG. 4, as indicated by arrows, the data D1 to D24 are defined in correspondence with the sections 1 to 24 of the pulse signal DOTX 1.

(E) of FIG. 4 is a diagram for representing a relationship between values of the data Dx and the pulse signal DOTX1. In the first embodiment, the drawing pulse generating unit 27 determines levels of the pulse signal DOTX 1 from the values of the data Dx based upon the relationship shown in (E) of FIG. 4. In the first embodiment, the data Dx employs 1-byte (8 bits) data. As represented in (E) of FIG. 4, in such a case that the value of the data Dx is either "00000000" or "11111111", the corresponding divided sections of the pulse signal DOTX 1 are set "H" levels, whereas in the case that the value of the data Dx is a code other than the above-described code, the corresponding divided sections of the pulse signal DOTX 1 are set to "L" levels. In other words, in response to gradation data (in this example, data indicative of 25 stages of gradation from zero-th gradation to 24th gradation) demodulated by the drawing pulse generating unit 27 (refer to FIG. 3), in the case of the zero-th gradation, all of the divided sections of the pulse signal DOTX 1 are set to the "L" levels; in the case of the first gradation, only one divided section of the pulse signal DOTX 1 is set to the "H" level; in the case of the second gradation, two divided sections of the pulse signal DOTX 1 are set to the "H" levels, . . . , in the case of the 24th gradation (darkest concentration), all of the divided sections of the pulse signal DOTX 1 are set to the "H" levels. (D) of FIG. 4 is a diagram for showing a drive signal MW for write power and a drive signal ME for erase power, which are outputted from a write strategy circuit, and are delayed by a time "ΔT2" with respect to the NRZI signal. The system control unit 19 adjusts a time "ΔT1" in such a manner that output timing of a trigger signal is made coincident with timing of sync 11T/11T of the strategy signals MW and ME, which is a certain divided section of the pulse signal DOTX 1.

FIG. 5 shows an example as to waveforms of the pulse signal DOTX 1 with respect to each gradation of 25 stages defined from the zero-th stage up to the 24th stage. In this setting operation, sections for the "H" levels of the pulse signal DOTX 1 are sequentially broadened on both a front side and a rear side from a center portion of the section of 1 EFM frame length in connection with such a condition that the gradation number is increased. The control unit 201 of the host computer 200 sets the values of the data D1 to D24 in such a manner that the pulse signal DOTX 1 shown in FIG. 5 is generated in response to the gradation degree every pixel of the image data. In other words, the control unit 201 sets such a data corresponding to the divided section for setting the level of the pulse signal DOTX 1 to the "H" level to a specific code (either "00000000" or "11111111" in first embodiment), whereas the control unit 201 sets such a data corresponding to the divided section for setting the level of the pulse signal DOTX 1 to the "L" level to a code other than the above-described specific code.

It should also be noted that in the first embodiment, although the code of either "00000000" or "11111111" is employed as the specific code for setting the pulse signal DOTX 1 to the "H" level, the specific code is not limited only to the above-described code, but any other codes (values) may be alternatively employed.

Figure 6:
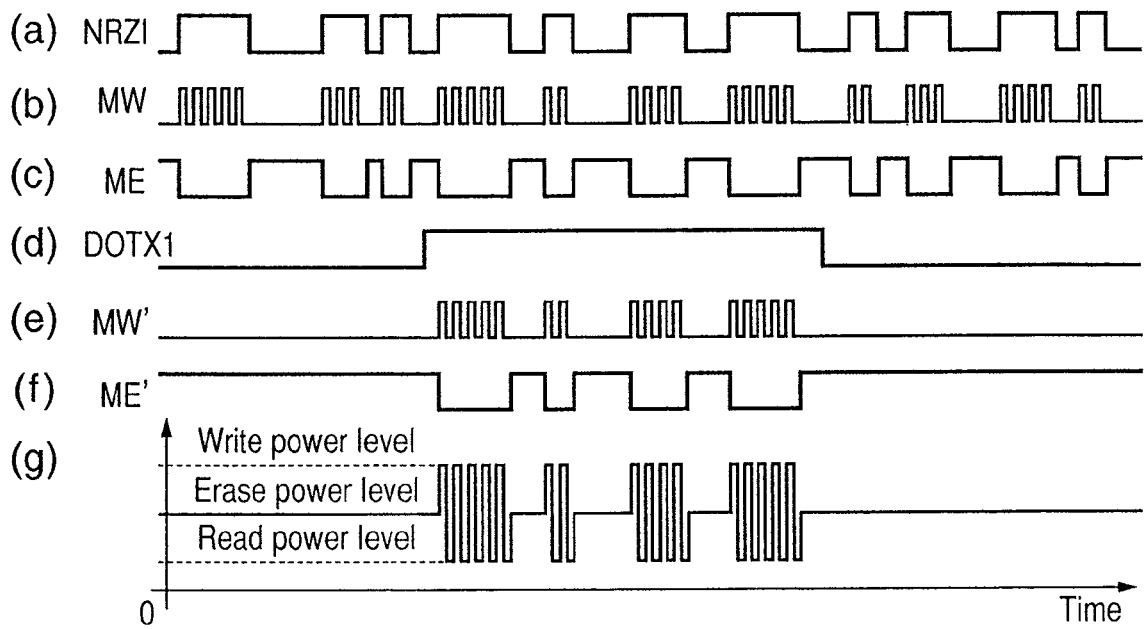
FIG. 6 is a time chart for representing various sorts of signals appeared in the system.

FIG. 6 is a diagram for showing an example as to operation waveforms of the gate circuit 28 when the drawing operation is carried out. In FIG. 6, an NRZI signal of (A) is a signal outputted from the encoder 23. The NRZI signal is converted by the strategy circuit 26 into a drive signal NW for write power shown in (B) and a drive signal ME for erase power shown in (C). Further, the NRZI signal is also transmitted to the drawing pulse generating unit 27 by which a pulse signal DOTX 1 and another pulse signal DOTX 2 are generated. It should also be noted that in the first embodiment, since the level of the pulse signal DOTX 2 is always the "H" level and has no influence given to the gating process operation in the gate circuit 28, the pulse signal DOTX 2 is omitted in the operation waveforms of FIG. 6. Both the drive signal MW for write power of (B) and the drive signal ME for erase power of (C) are switched by the gate circuit 28 based upon the time period of 1 EFM frame length by the pulse signal DOTX 1 of (D), so that a drive signal MW for write power' shown in (E), and a drive signal ME for erase power' shown in (F) are generated. As represented in FIG. 6, in the case that the level of the pulse signal DOTX 1 is an "H" level, the drive signal MW for write power directly passes through the gate circuit 28. On the other hand, in the case that the level of the pulse signal DOTX 1 is an "L" level, the level of the drive signal MW for write power becomes an "L" level. As shown in this drawing, the drive signal ME for erase power directly passes through the gate circuit 28 when the level of the pulse signal DOTX 1 is an "H" level, and on the other hand, the level of this drive signal ME for erase power is fixed to the "H" level when the level of the pulse signal DOTX 1 is an "L" level.

Both the drive signal MW for write power' indicated in (E) and the drive signal ME for erase power' shown in (F) are supplied to the laser driver 22, and thus, the laser driver 22 irradiates such a laser light having a power level shown in (G) from the optical pickup 14.

(1-2) Operations

Next, a description is made of operations of the above-described system of the first embodiment. When the optical disk 100 is inserted in the optical disk recording apparatus 1, the system control unit 19 judges whether or not a command for instructing a certain process operation is received from the host computer 200. When the command is received, the system control unit 19 judges whether or not the received command corresponds to such a command for instructing a drawing operation. If the received command is not such a command for designating the drawing operation, then the system control unit 19 executes a process operation (either data recording operation or data regenerating operation) designated by this command. It should also be noted that since the data recording operation and the data regenerating operation with respect to the optical disk 100 are the same as those of the conventional system, detailed descriptions thereof will be omitted.

Figure 7:
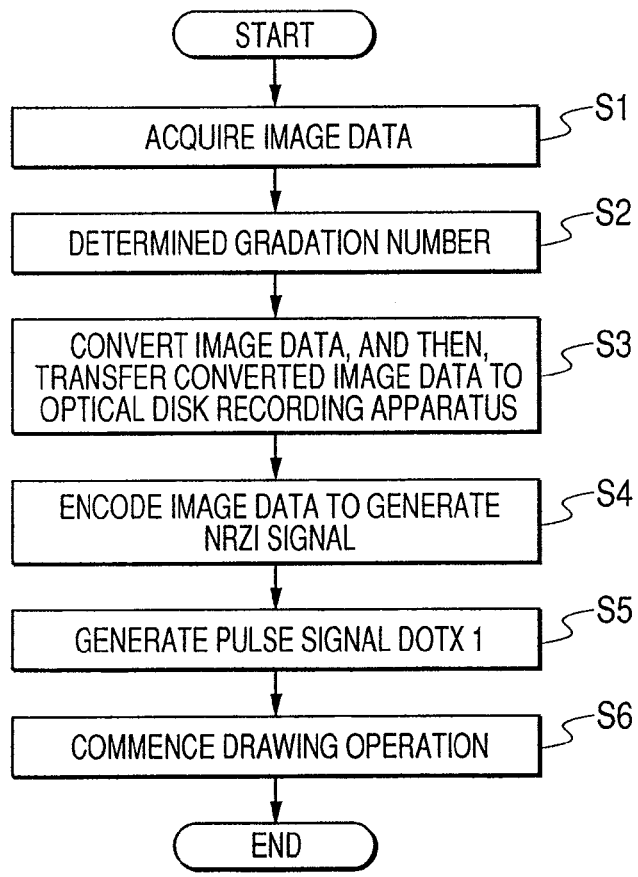
FIG. 7 is a flow chart for describing process operation of the system according to the first embodiment.

FIG. 7 is a flow chart for describing process operations of the above-described system when the drawing operation is carried out. When the optical disk 100 is inserted to the optical disk recording apparatus 1, the process operations shown in FIG. 7 are commenced. Firstly, the control unit 201 of the computer 200 acquires image data indicative of such an image which should be drawn on the inserted optical disk 100 (step S1). The above-described image data may be generated by, for instance, the control unit 201 of the host computer 200 in response to an operation content by a user. Alternatively, the image data may be received, for instance, via a communication network such as the Internet. Also, previously stored image data may be alternatively selected in response to the operation content by the user so as to be read. When the image data is acquired any acquisition methods may be employed.

Next, the control unit 201 of the host computer 200 determines a gradation number of an image which is drawn on the optical disk 100 (step S2). Alternatively, as to a decision of a gradation number, the control unit 201 may alternatively determine a gradation number in response to an operation content by the user, or may determine a gradation number in response to a previously determined set value. Subsequently, the host computer 200 converts a format of image data in response to the determined gradation number. At this time, the control unit 201 of the host computer 200 converts the format of the image data into such an image data that when the image data is EFM-modulated, a gradation degree every pixel is displayed based upon the data D1 to D24 contained in the EFM frame. Then, the control unit 201 transfers the converted image data to the optical disk recording apparatus 1 (step S3)

When the optical disk recording apparatus 1 receives the image data from the host computer 200, the optical disk recording apparatus 1 encodes the received image data so as to generate an NRZI signal (step S4). The generated NRZI signal is supplied to both the strategy circuit 26 and the drawing pulse generating unit 27. The drawing pulse generating unit 27 generates a pulse signal DOTX 1 based upon the NRZI signal (step S5). Also, the strategy circuit 26 generates a drive signal MW for write power and a drive signal ME for erase power from the NRZI signal. Both the generated drive signal MW for write power and the generated drive signal ME for erase power are corrected based upon the pulse signal DOTX 1 in the gate circuit 28, and then, the corrected drive signals MW and ME are outputted to the laser driver 22. The laser driver 22 controls a power level of laser light of the optical pickup 14 in response to the supplied drive signal, so that the drawing operation is carried out with respect to the label surface LS of the optical disk 100 (step S6).

As previously described, in this first embodiment, when the signal level of the pulse signal DOTX 1 is the "H" level, the write power and the erase power as described during the data recording operation are turned ON, and also, both amorphous marks having lengths and space lengths along the MRZI signal are formed on the optical disk 100. As a result, the image is formed on the drawing layer 112 of the optical disk 100.

Also, in the first embodiment, the laser light having the erase level is continuously irradiated onto the regions where the amorphous marks are not formed (in case that level of pulse signal DOTX 1 is "L" level). As a result, even when the amorphous marks of the existing image are present on the optical disk 100, the amorphous marks of this existing image are returned to the original crystallized statuses to be erased. As a consequence, it is possible to avoid that the existing image is lefted on the optical disk 100, and thus, the image can be formed in the higher grade, as compared with that of the conventional technique, with respect to rewriting of the images for the optical disk 100. Also, in the first embodiment, since the writing operation and the erasing operation are carried out at the same time with respect to the optical disk 100, the image can be directly rewritten. As a consequence, the required processing time can be shortened.

(2) Second Embodiment

Next, a description is made of a system of a second embodiment according to the present invention. In the below-mentioned description, for the sake of explanations, such an image which has already been drawn on the optical disk 100 will be referred to as an "existing image", whereas another image which is newly drawn on the optical disk 100 will be referred to as a "rewriting image." In the second embodiment, as the "existing image" and the "rewriting image", such an image is employed which is represented by 3 stages of gradation, namely a gradation level "0" through a gradation level "2."

This second embodiment has the following different points from those of the above-described first embodiment: That is, a content of a pulse signal DOTX 2 generated by the drawing pulse generating unit 27 is different from that of the first embodiment, and also, a process operation executed by the host computer 200 with respect to the optical disk 100 during a drawing operation is different from that of the first embodiment. Other arrangements and other operations are similar to those shown in the first embodiment. As a result, the same reference numerals shown in the first embodiment will be employed as those for denoting the similar arrangements and the similar operations in the second embodiment, and descriptions thereof will be properly omitted.

In the above-described first embodiment, the drawing pulse generating unit 27 has always outputted the pulse signal DOTX 2 having the "H" level irrespective of the content of the NRZI signal. Instead of this operation, in this second embodiment, the drawing pulse generating unit 27 generates a pulse signal DOTX 2 in response to the content of the NRZI signal.

Figure 8:
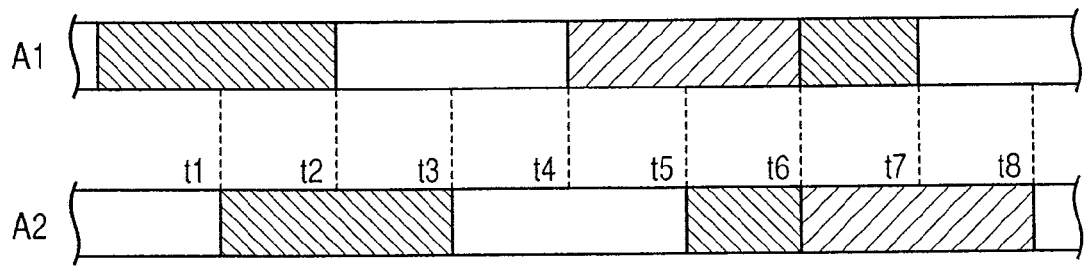
FIG. 8 is a diagram for indicating an example as to a rewriting mode of an image.

FIG. 8 is a diagram for representing one example as to rewriting modes of images. In FIG. 8, an existing image "A1" shows such a gradation of the existing image "A1" every pixel thereof within a certain range, and a rewriting image "A2" shows such a gradation of the rewriting image "A2" every pixel thereof within a certain range. In the second embodiment, a power level of laser light to be irradiated is controlled in response to a mode difference between gradation of the existing image A1 and gradation of the rewriting image A2.

Figure 9:
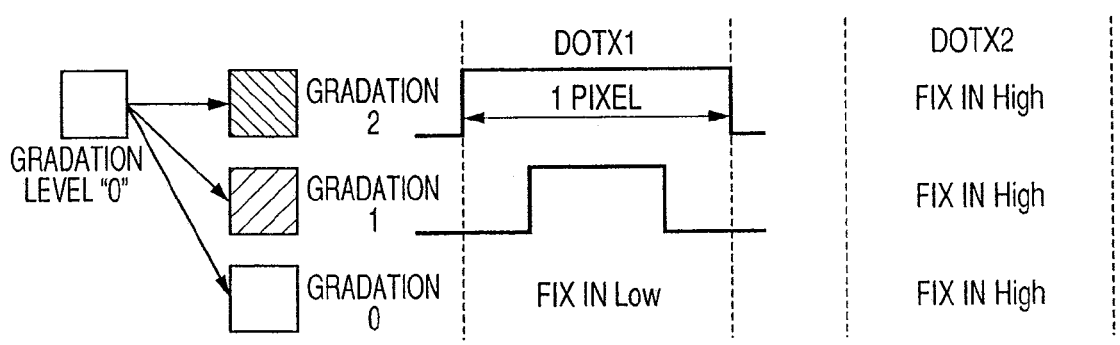
FIG. 9 is a diagram for indicating a content of a pulse signal in such a case that a gradation correction is carried out from the gradation level "0."
Figure 10:
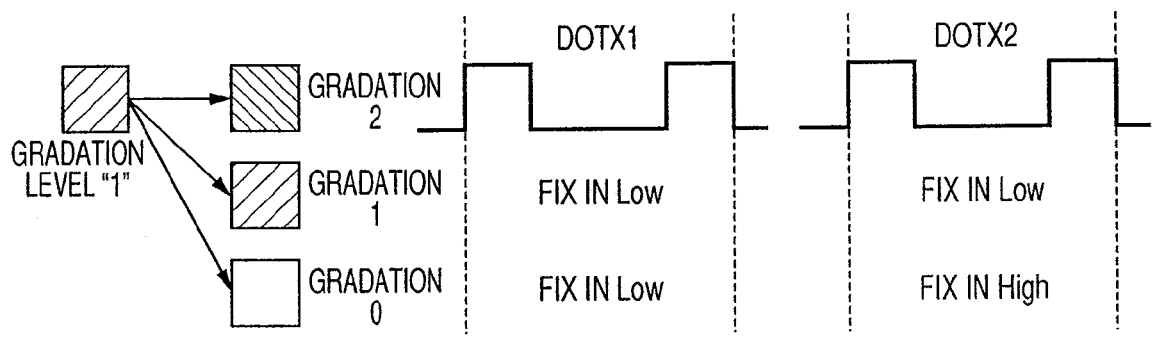
FIG. 10 is a diagram for indicating a content of a pulse signal in such a case that a gradation correction is carried out from the gradation level "1."
Figure 11:
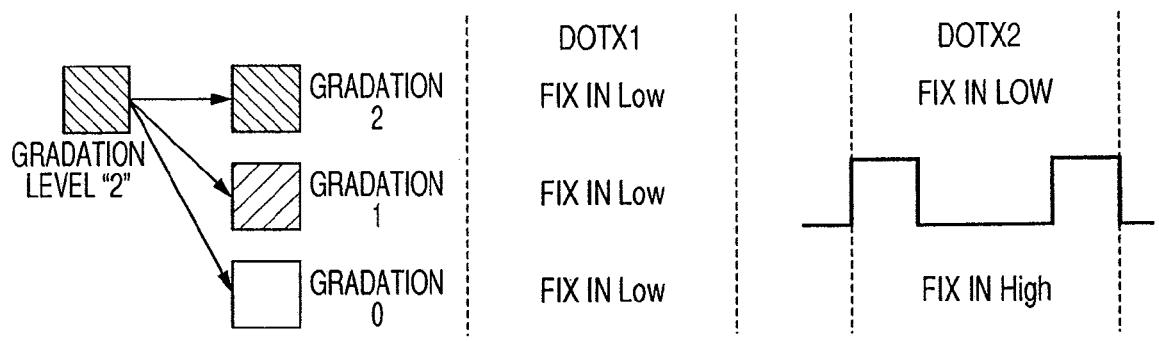
FIG. 11 is a diagram for indicating a content of a pulse signal in such a case that a gradation correction is carried out from the gradation level "2."

FIG. 9 to FIG. 11 are diagrams for indicating contents of the pulse signals DOTX 1 and DOTX 2 in such a case that gradation of the existing image corresponds to the gradation level "0" through the gradation level "2" respectively. FIG. 9 is a diagram for showing contents of the pulse signals DOTX 1 and DOTX 2 in such a case that a pixel region where gradation of the existing image is the gradation level "0" is rewritten. FIG. 10 is a diagram for indicating signal contents of the pulse signals DOTX 1 and DOTX 2 in such a region that the gradation level of the existing image is 1. FIG. 11 is a diagram for indicating signal contents of the pulse signals DOTX 1 and DOTX 2 in such a region that the gradation level of the existing image is 2.

In FIG. 8, a description is made of such a case that the rewriting image A2 is drawn on the optical disk 100 where the existing image A1 is drawn. In FIG. 8, although the gradation status is brought into a status of gradation 2 from a time instant t1 to a time instant t3, as shown in this drawing, the time instants t1 to t2 correspond to the status of the gradation 2 from the gradation 2, and on the other hand, within the time instant t2 to the time instant t3, a status of gradation 2 is formed from a status of gradation 0. At this time, if the region from the time instant t1 to the time instant t3 is drawn by the same image data, then there are some possibilities that the region from the time instant t1 to the time instant t2 becomes darker than the region from the time instant t2 to the time instant t3 when a thermal reversibility layer having a superior visually recognization is employed. As a result, in the second embodiment, while the pulse signal DOTX 2 represented in FIG. 9 to FIG. 11 is employed, the drive signal for write power and the drive signal for erase power are corrected.

Referring now to FIG. 3, a description is made of signals which pass through the gate circuit 28. It should be understood that the below-mentioned description describes only different technical points from those of the above-explained first embodiment, and a similar structure to that of the first embodiment will be properly omitted.

The drawing pulse generating unit 27 always outputs a pulse signal DOTX 2 having an "H" level when a data recording operation is carried out. This process operation is similar to that of the first embodiment, and therefore, explanation thereof will be omitted. On the other hand, when a drawing operation is carried out, the drawing pulse generating unit 27 generates such a pulse signal DOTX 2, the time period of which is equal to 1 EFM frame length, and the duty ratio of which is changed in response to control data (second control signal) every pixel, which is contained in the acquired image data. The pulse signal DOTX 2 is entered to one input terminal of the AND gate 284. As a consequence, when the drawing operation is carried out, the AND gate 284 opens its gate only for a time duration responding to the control data (second control signal) of the corresponding pixel every 1 EFM frame period in order that the AND gate 284 causes the drive signal ME for erase power' of the strategy circuit 26 to pass therethrough only for this time duration, while the drive signal ME for erase power' is entered to the other input terminal of the AND gate 284.

Figure 12:
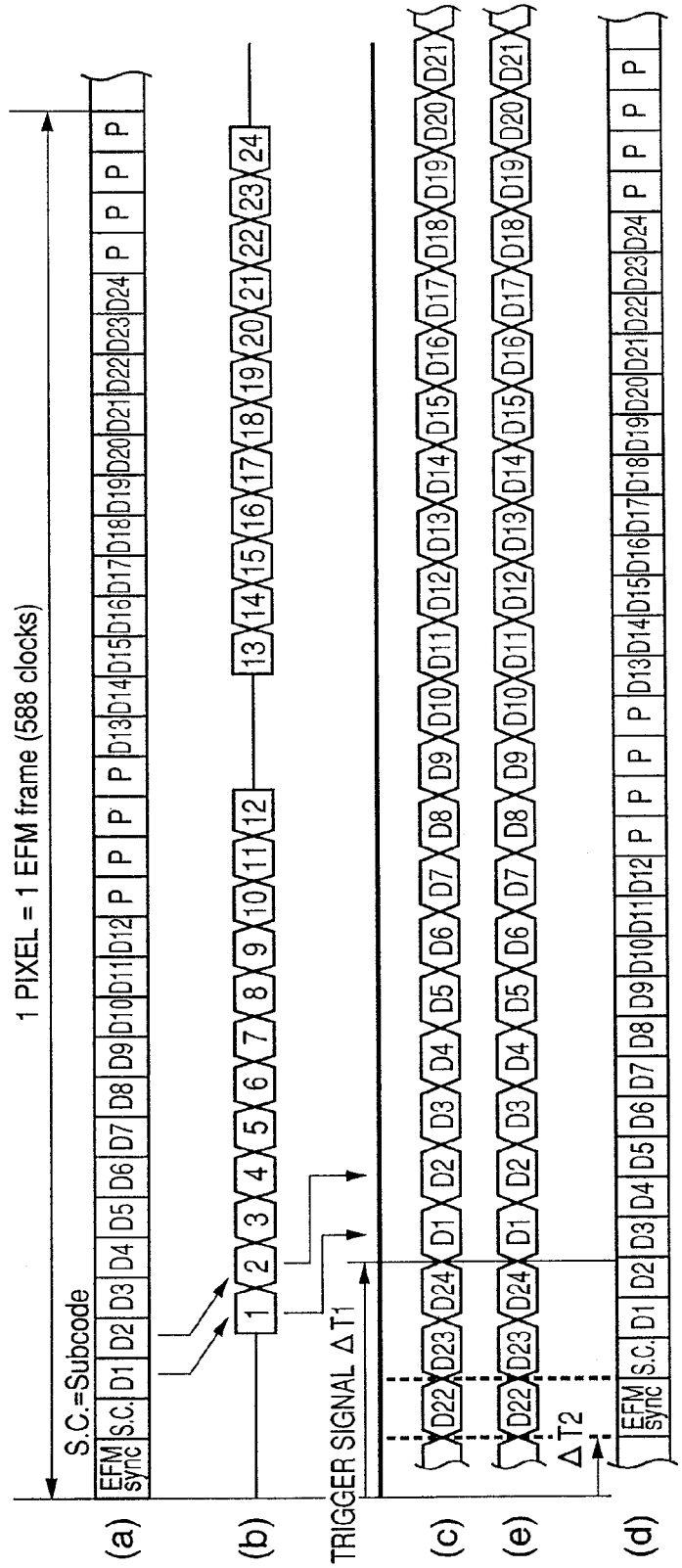
FIG. 12 is a diagram for showing a relationship between a data structure of an EFM frame and pulse signals.

In this case, a description is made of setting operations as to duty ratios of the pulse signal DOTX 1 and the pulse signal DOTX 2, which are outputted from the drawing pulse generating unit 27 during the drawing operation with reference to FIG. 12. It should also be noted that (A) to (D) are identical to (A) to (D) of FIG. 4 described in the first embodiment, and therefore, explanations thereof will be omitted.

(E) of FIG. 12 is a diagram for representing a pulse signal DOTX 2. Similar to the pulse signal DOTX 1, the pulse signal DOTX 2 is such a signal that while 1 EFM frame length is equally subdivided by 24 to obtain sections 1 to 24, a signal level of this pulse signal is set to either an "H" level or an "L" level in the unit of this subdivided section. In FIG. 12, as indicated by arrows, the data D1 to D24 are defined in correspondence with the sections 1 to 24 of the pulse signal DOTX 2.

(F) of FIG. 12 is a diagram for representing a relationship between values of the data Dx (symbol "x" indicates natural number frame 1 to 24) and the pulse signal DOTX 2. In the second embodiment, the drawing pulse generating unit 27 determines levels of the pulse signals DOTX 1 and DOTX 2 from the values of the data Dx based upon the relationship shown in (F). In the second embodiment, as represented in (F), in such a case that the value of the data Dx is "00000000", divided sections corresponding to the pulse signal DOTX 1 and the pulse signal DOTX 2 are set "H" levels. On the other hand, in the case that the value of the data Dx is "00001111", divided sections corresponding to the pulse signal DOTX 1 are set to "L" levels, whereas divided sections corresponding to the pulse signal DOTX 2 are set to "H" levels. Also, in such a case that the value of the data Dx is "11111111", divided sections corresponding to the pulse signal DOTX 1 are set to "H" levels, whereas divided sections corresponding to the pulse signal DOTX 2 are set to "L" levels. In the case that the value of the data Dx is any other value than the above-described values, divided sections corresponding to the pulse signals DOTX 1 and DOTX 2 are set to "L" levels.

Figure 13:
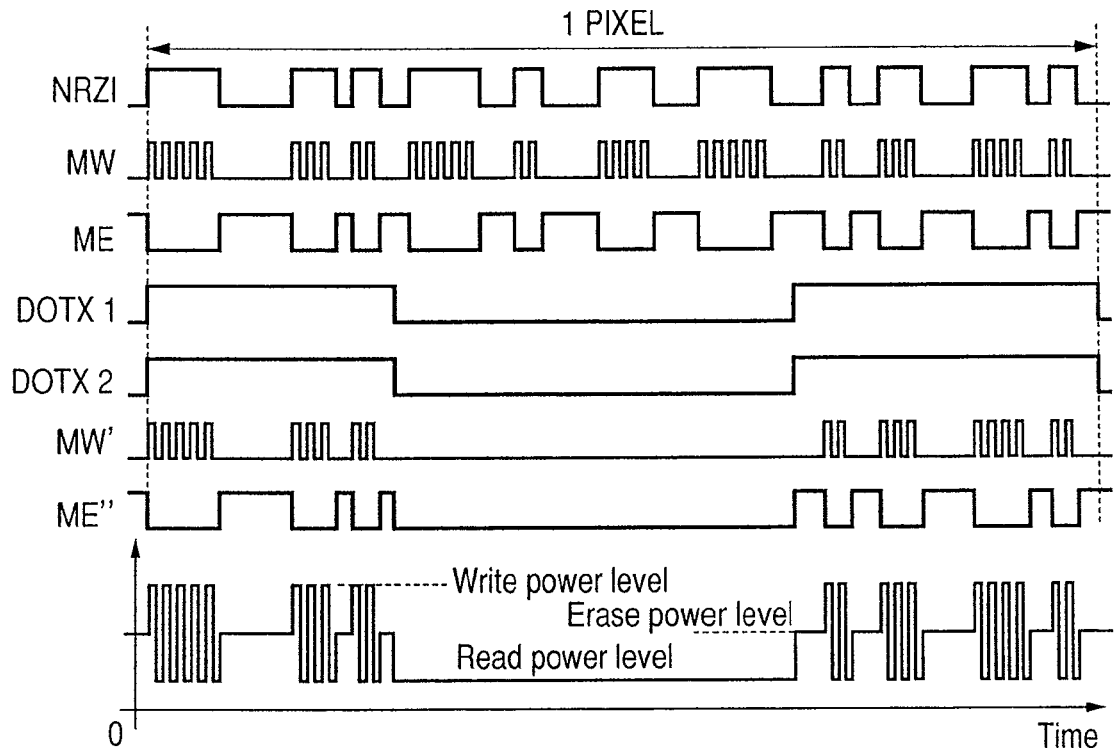
FIG. 13 shows an example as to a flow chart of various signals in the case that an image is overwritten from the gradation level 1 to the gradation level 2.
Figure 14:
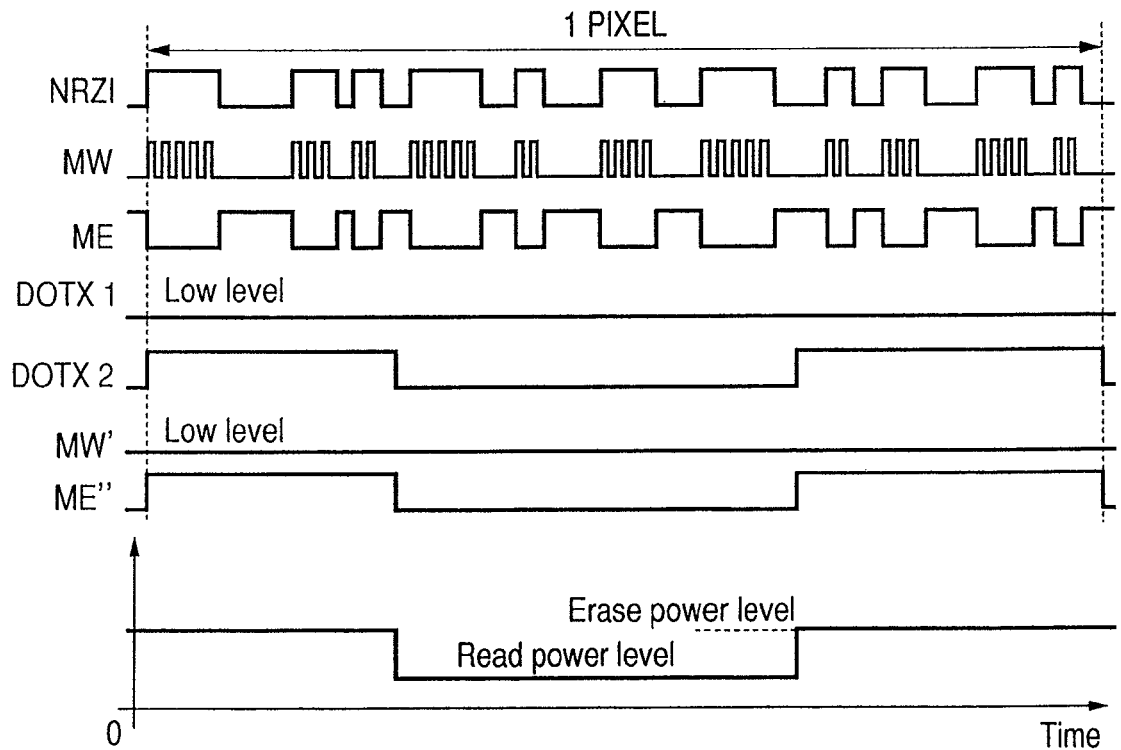
FIG. 14 shows an example as to a flow chart of various signals in the case that an image is overwritten from the gradation level 2 to the gradation level 1.

Next, referring now to FIG. 13 and FIG. 14, a description is made of concrete examples as to waveforms of respective signals when an image is rewritten.

FIG. 13 is an example as to a time chart of the respective signals in the case that an overwriting operation is carried out from the gradation 1 to the gradation 2. The gradation 1 is such a status that marks are present only a central portion of a region of 1 pixel, whereas the gradation 2 is such a status that marks are present over the entire region. As a consequence, in order to transfer the status of the gradation 1 to the status of the gradation 2, the central portion of 1 pixel region is irradiated by the laser light having the read level without changing the drawing layer, so that only the region outside the central portion is irradiated by the laser light having the write level so as to form marks. Concretely speaking, the above-described image rewriting operation can be realized by setting "00000000" to the data D1 to D6 and the data D19 to D24, and by setting "11110000" to the data D7 to D18.

FIG. 14 is an example as to a time chart of the respective signals in the case that an overwriting operation is carried out from the gradation 2 to the gradation 1. In order to transfer the status of the gradation 2 to the status of the gradation 1, since the marks of the outside region may be erased, the laser light having the erase level is continuously irradiated to the outside portion, the laser light having the read level is irradiated onto the central portion, so that the marks are lefted. Concretely speaking, the above-described image rewriting operation can be realized by setting "00001111" to the data D1 to D6 and the data D19 to D24, and by setting "11110000" to the data D7 to D18.

On the other hand, in such a case that the gradation is not changed from the existing image, when the rewriting operation is carried out in accordance with the manner as shown in FIG. 9 to FIG. 11, both the signal levels of the pulse signals DOTX 1 and DOTX 2 become "L" levels, and the laser output always becomes the read level. In this case, a light receiving level after a servo sampling operation is lowered, so that the servo system becomes unstable. As a consequence, in the second embodiment, in the case that both the signal levels of the pulse signals DOTX 1 and DOTX 2 are the "L" levels within 1 frame, the pulse signal DOTX 2 is forcibly outputted at a position of sync.

In this case, since the value of the data D2 shown in FIG. 12 is set to either "00000000" or "00001111" irrespective of the gradation and the image data, the laser light having the erase level is outputted at the position of sync of the drive signal ME for erase power. It should be noted that the output positions of the trigger signal are adjusted in such a manner that the respective pulse signals DOTX are made coincident with the sync positions of the strategy signal.

It should also be understood that the timing when the laser light having the erase level is outputted is not limited only to the sync positions of the strategy signal, but at least any one signal of the data D1 to D24 may correspond to such a signal indicative of the erase level, and such a bit stream signal that other signals indicate the strength of the read level may be merely supplied as the drive signal to the laser driver 22.

(2-1) Operations

Figure 15:
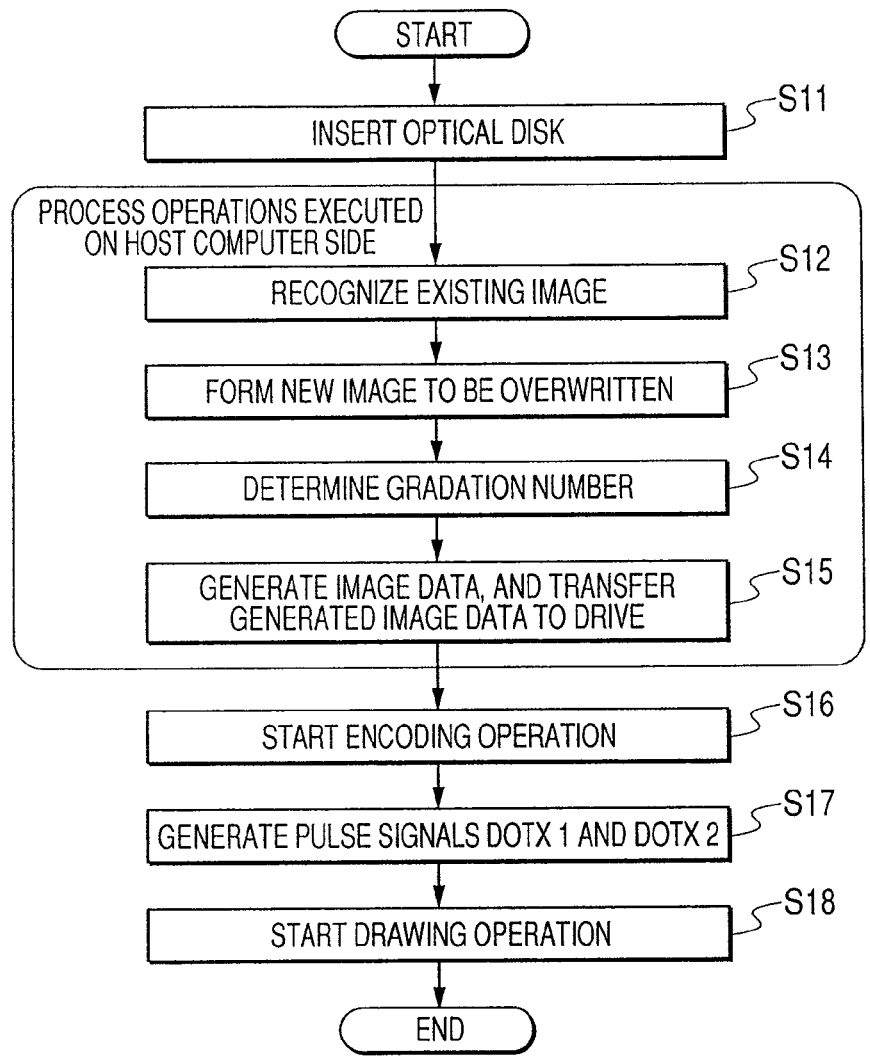
FIG. 15 is a flow chart for describing process operations of a system according to a second embodiment of the present invention.

Next, a description is made of operations as to the above-described system. FIG. 15 is a flow chart for indicating process operations of this system. When the optical disk 100 is inserted into the optical disk recording apparatus (step S11), the process operations shown in FIG. 15 is commenced. Firstly, the control unit 201 of the host computer 200 acquires existing image data which indicates existing image A1 of the inserted optical disk 100 (step S12). This acquisition process operation may be alternatively realized by that, for instance, the control unit 201 may select any one of the image data stored in the storage unit 202 in response to an operation by a user so as to acquire the selected image data. Next, the host computer 200 acquires such an image data indicative of a rewritable image which should be overwritten (step S13). Next, the control unit 201 of the host computer 200 determines a gradation number of the image (step S14). The host computer 200 converts a format of the image data in response to the determined gradation number, and then transfers the format-converted image data to the optical disk recording apparatus 1 (step S15). More precisely speaking, the control unit 201 generates such an image data in such a manner that the rewriting image data is compared with the existing image data in the unit of the pixel, and the image data contains data (first control signal) indicative of gradation as to each of the pixels of the rewriting image data, and also, contains data (second control signal) indicative of a mode difference of the gradation every pixel.

When the optical disk recording apparatus 1 receives the image data from the host computer 200, the optical disk recording apparatus 1 encodes the received image data so as to generate an NRZI signal (step S16). The generated NRZI signal is supplied to both the strategy circuit 26 and the drawing pulse generating unit 27. The drawing pulse generating unit 27 generates a pulse signal DOTX 1 and another pulse signal DOTX 2 based upon the NRZI signal (step S17). The strategy circuit 26 generates a drive signal MW for write power and a drive signal ME for erase power based upon the NRZI signal. The generated drive signal MW for write power and the generated drive signal ME for erase power are corrected in the gate circuit 28 based upon the pulse signal DOTX 1 and the pulse signal DOTX 2, and then, the corrected drive signal MW for write power and the corrected drive signal ME for erase power are outputted to the laser driver 22. The laser driver 22 controls the power level of the laser light of the optical pickup 14 in response to the supplied drive signal. As a result, a drawing operation is performed on the label surface LS of the optical disk 100 (step S18).

In other words, in this second embodiment, the drawing pulse generating unit 27 generates such a pulse signal DOTX 1 indicative of a time period during which the laser light having the erase level is irradiated in response to the gradation data (first control signal) of each of the pixels contained in the image data outputted from the encoder 23. The drawing pulse generating unit 27 generates such a pulse signal DOTX 2 indicative of a time period during which the rewriting operation is not carried out in response to the data (second control signal) which represents a mode difference in gradation degrees for each of the pixels contained in the image data outputted from the encoder 23. In a time period (second time period) during which the level of the pulse signal DOTX 2 is an "L" level, since a gating process operation is performed in the gate circuit 28 (refer to FIG. 3), a drive signal indicative of the read level is supplied to the laser driver 22. On the other hand, in a time period during which the level of the pulse signal DOTX 2 is an "H" level and further the level of the pulse signal DOTX 1 is an "H" level (namely, time period other than second time period, and time period other than first time period), the drive signal generated in the strategy circuit 26 is directly supplied to the laser driver 22. On the other hand, in a time period during which the level of the pulse signal DOTX 2 is an "H" level and further the level of the pulse signal DOTX 1 is an "L" level (namely, time period other than second time period, and time period involved in first time period), the drive signal indicative of the erase level is supplied to the laser driver 22.

On the other hand, generally, when a re-drawing operation is repeatedly performed, there are some possibilities that drawn dots become large. To the contrary, in the second embodiment, the drive signal for write power and the drive signal for erase power are corrected based upon the relationship between the gradation of each pixel of the existing image and the gradation of the new image. As a result, even when the direct overwriting operation is carried out, the gradation of the new image can be formed at the target irrespective of the status of the existing image. As previously described, in this second embodiment, the disturbance of the gradation after the overwriting operation is carried out can be suppressed.

In the second embodiment, since the laser light having the erase level is outputted at the position of sync, it is possible to avoid that the level of the received light after the servo sampling operation is carried out is lowered, so that the servo is brought into unstable condition.

(3) Third Embodiment

In the above-described second embodiment, the images having such gradation with the same resolution are rewritten. Instead of the above-described image rewriting operation, a gradation degree of an existing image is changed in a different gradation degree in a system according to a third embodiment of the present invention.

This third embodiment has the following different points from those of the above-described second embodiment: That is, a content of image data generated by the host computer 200 when a drawing process operation for the optical disk 100 is carried out is different from that of the second embodiment. Other arrangements and other operations of the third embodiment are similar to those shown in the second embodiment. As a result, the same reference numerals shown in the second embodiment will be employed as those for denoting the similar arrangements and similar operations in the third embodiment, and descriptions thereof will be omitted.

Figure 16:
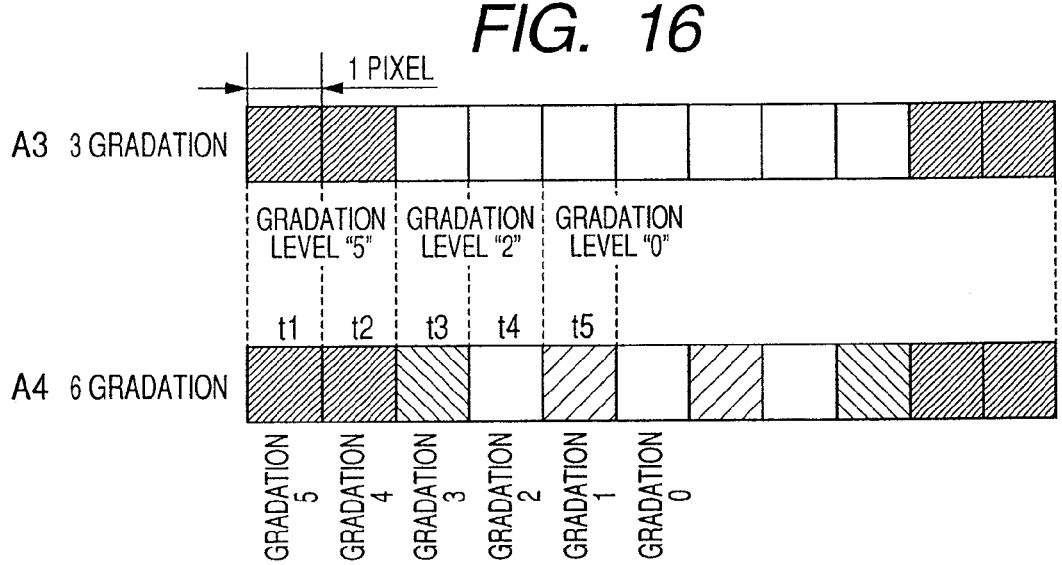
FIG. 16 is a diagram for showing one example as to a rewriting mode of an image.
Figure 17:
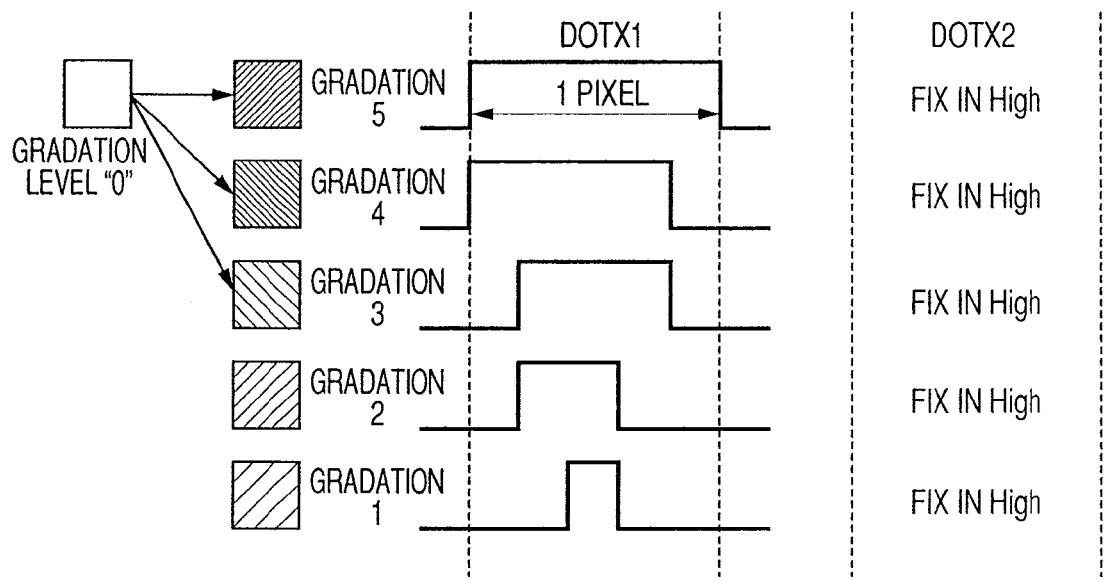
FIG. 17 is a diagram for indicating a content of a pulse signal in such a case that a gradation correction is carried out from the gradation level "0."
Figure 18:
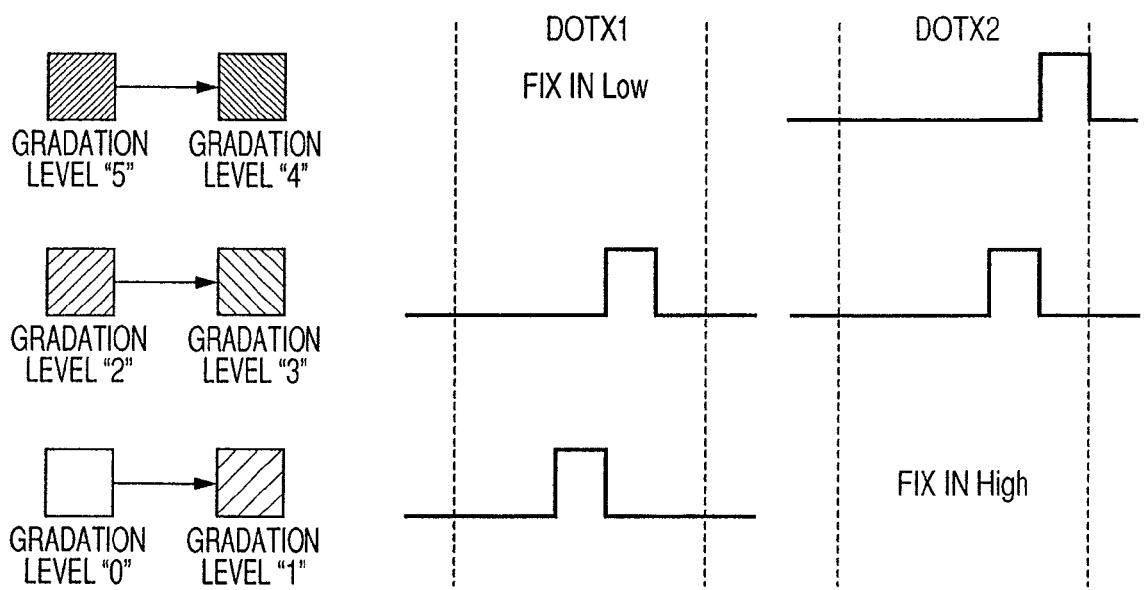
FIG. 18 is a diagram for representing contents of pulse signals in the case that a rewriting operation is carried out so as to increase a gradation degree.

The third embodiment describes a gradation correction which is applied to such a case that the gradation is increased when an overwriting operation is carried out. While an effective image in high gradation is a gradation image, a description is made of such a gradation image as exemplified in FIG. 16. FIG. 16 is a diagram for showing an example as to a mode for rewriting an image. In this drawing, an existing image "A3" indicates gradation every pixel which is represented by 3 gradation, and a rewriting image "A4" shows gradation every pixel which is represented by 6 gradation. As shown in FIG. 16, the existing image A3 is an image of 3 gradation (namely, gradation levels 5, 2, and 0), whereas the rewriting image A4 is an image of 6 gradation (namely, gradation levels 5 to 0). In the example of FIG. 16, the gradation effect may be increased by the following manners: a region defined from a time instant t1 to a time instant t2 is decreased from the gradation level 5 to the gradation level 4; a region defined from the time instant t2 to a time instant t3 is increased from the gradation level 2 to the gradation level 3; and also, a region defined from a time instant t4 to a time instant t5 is increased from the gradation level 0 to the gradation level 1. FIG. 17 represents contents of a pulse signal DOTX 1 and a pulse signal DOTX 2 in respective gradation levels when an initial recording operation is carried out. FIG. 18 indicates waveforms of the pulse signal DOTX 1 and the pulse signal DOTX 2 for gradation corrections.

Similar to the above-described second embodiment, in this third embodiment, a power level of laser light to be irradiated is controlled in response to a mode difference between gradation of an existing image and gradation of a rewriting image.

The control unit 201 of the host computer 200 acquires existing image data and rewriting image data, and converts the image data in response to gradation of respective pixels of such an image which is represented by the acquired rewriting image data. Also, the control unit 201 compares the existing image data with the rewriting image data in the unit of the pixel, and converts the image data in response to a mode difference of the gradation. In other words, the control unit 201 generates such an image data which contains both a control signal for indicating the gradation of the respective pixels of the image which is indicated by the rewriting image data, and another control signal for indicating the mode difference of the gradation with respect to each of the pixels between the existing image data and the rewriting image data.

As previously explained, in this third embodiment, since the gradation for each of the pixel is changed, not only the image can be changed, but also the gradation can be changed. In other words, while the image portion of the existing image whose gradation resolution is low is left, the existing image can be converted into such an image having gradation of high resolution. For instance, while the existing image is drawn based upon 3 gradation, the inventive idea of the third embodiment is applied to such a case that the same image is drawn based upon 6 gradation. As apparent from the foregoing descriptions, gradation of an existing image may be changed into high resolution gradation of a different image from the existing image.

(4) Modifications

While the various embodiments of the present invention have been described, the present invention is not limited only to the above-described embodiments, but may be embodied in various sorts of other modes, which will be exemplified in the following examples:

That is, in the above-described embodiments, the host computer 200 acquires the existing image data in response to the operations by the user. The acquisition method for the existing image data is not limited only to the above-described acquisition method, but may be alternatively realized as follows: That is, for instance, an existing image may be roughly grasped by irradiating laser light having a read level onto the drawing plane of the optical disk 100 and by detecting laser light returned from the drawing plane, so that image data may be acquired from the roughly grasped existing image. Also, when an image is drawn on the label surface LS of the optical disk 100, while such a memory table is stored which has stored there into the identification information for identifying the optical disk 100 in relation to image data of the image drawn on the optical disk, the identification information of this optical disk 100 may be alternatively retrieved from the memory table so as to read out the image data drawn on the optical disk 100. Furthermore, while data indicative of such an image drawn on an optical disk is recorded on a predetermined region of either a recording surface or a label surface of this optical disk, the optical disk recording apparatus 1 may alternatively read out the data recorded on the predetermined region so as to acquire the image data. In summary, if image data drawn on optical disks are acquired, then any sorts of image data acquisition methods may be alternatively employed.

In the above-described second embodiment, such an image whose gradation levels are expressed by the 3 gradation (gradation levels 0 to 2) is drawn on the optical disk 100. However, the gradation number of the image to be drawn is not limited only to 3, but may be increased, or decreased from this gradation number of 3. For example, an image having 2 gradation (2 colors) maybe alternatively drawn, or an image having 6 gradation (6 colors) may be alternatively drawn. It should be understood that since 24 pieces of the main data are contained in 1 frame of the NRZI signal, an image having gradation up to 25 sorts of gradation in maximum can be represented in the above-explained first to third embodiments.

The programs which are executed by the control unit 201 of the host computer 200 may be provided under such a condition that these programs have been recorded on various sorts of recording media, for instance, a magnetic tape, a magnetic disk, a flexible disk, an optical recording medium, a magneto-optical recording medium, a RAM, a ROM, and the like. Alternatively, the programs may be downloaded via such a network as the Internet to the host computer 200.

What is claimed is:

1. An optical disk drawing apparatus comprising:
 a receiver that receives pixel data of an image to be drawn on an optical disk;
 an image data generator that generates image data by frame-formatting the received pixel data;
 a drive signal generator that generates a drive signal indicative of irradiation timing for any one of a write level, an erase level, and a read level based upon the generated image data;
 an image data identifying unit that identifies a first control signal indicative of a gradation degree for every pixel contained in that image data;
 a first time period specifying unit that specifies a time period for irradiating the laser light of the erase level as a first time period based upon the identified first control signal;
 a gate unit that supplies the drive signal indicative of the erase level within the specified first time period, and supplies the drive signal generated in a time period other than the specified first time period; and
 a laser irradiating unit that irradiates laser light at the timing indicative of the supplied drive signal, wherein
  the image data contains a second control signal which indicates a mode difference of gradation degrees for every pixel between an image indicative of the image data and a predetermined image,
  the image data identifying unit identifies the second control signal,
  the optical disk drawing apparatus further comprises a second time period specifying unit that specifies a time period during which a rewriting operation is not performed based upon the identified second control signal as a second time period,
  the gate unit supplies the drive signal indicative of the read level to the laser light irradiating unit within the specified second time period,
  the gate unit supplies the drive signal indicative of the erase level to the laser light irradiating unit within a time period which is defined by a time period other than the second time period and is involved in the first time period, and
  the gate unit supplies the generated drive signal within a time period which is defined by a time period other than the second time period and other than the first time period.

2. The optical disk drawing apparatus according to claim 1, wherein
 the second control signal is made up of at least one bit stream signal indicative of strength of the erase level within 1 frame, and a bit stream signal indicative of the strength of the read level; and
 the gate unit supplies a drive signal indicative of the erase level to the laser light irradiating unit within a time period other than the specified second time period.

3. The optical disk drawing apparatus according to claim 1, wherein the write level indicates a level for discoloring a color of a layer on the optical disk, the erase level indicates a level for returning the color of the layer on the optical disk from discolored and the read level indicates a level to read data on the optical disk that does not affect the color of the layer on the optical disk.

4. An optical disk drawing method comprising:
 receiving pixel data of an image to be drawn on an optical disk;
 generating image data by frame-formatting the received pixel data;
 generating a drive signal indicative of irradiation timing for any one of a write level, an erase level, and a read level based upon the generated image data;
 identifying a first control signal indicative of a gradation degree every pixel contained in that image data;

specifying a time period for irradiating the laser light of the erase level as a first time period based upon the identified first control signal;

supplying, to a laser irradiating unit, the drive signal indicative of the erase level within the specified first time period, and supplies the drive signal generated in a time period other than the specified first time period; and irradiating laser light at the timing indicative of the supplied drive signal by the laser irradiating unit, wherein the image data contains a second control signal which indicates a mode difference of gradation degrees for every pixel between an image indicative of the image data and a predetermined image, and the method further comprises:

identifying the second control signal, specifying a time period during which a rewriting operation is not performed based upon the identified second control signal as a second time period, supplying, to the laser irradiating unit, the drive signal indicative of the read level to the laser light irradiating unit within the specified second time period, supplying, to the laser irradiating unit, the drive signal indicative of the erase level to the laser light irradiating unit within a time period which is defined by a time period other than the second time period and is involved in the first time period, and supplying, to the laser irradiating unit, the generated drive signal within a time period which is defined by a time period other than the second time period and other than the first time period.

5. The method according to claim 4, wherein the second control signal is made up of at least one bit stream signal indicative of strength of the erase level within 1 frame, and a bit stream signal indicative of the strength of the read level; and a drive signal indicative of the erase level is supplied to the laser light irradiating unit within a time period other than the specified second time period.

6. The method according to claim 4 further comprising:

acquiring first image data indicative of the image to be drawn on the optical disk;

acquiring second image data indicative of an image which has been drawn on the optical disk;

generating the first control signal for every pixel, the first control signal representing a gradation degree of each pixel of the acquired first image data;

comparing the acquired first image data acquiring unit with the acquired second image data pixel by pixel so as to generate the second control signal; and an output that outputs the first image data in which the generated first control signal and generated the second control signal are contained.

7. The method according to claim 4, wherein the write level indicates a level for discoloring a color of a layer on the optical disk, the erase level indicates a level for returning the color of the layer on the optical disk from discolored and the read level indicates a level to read data on the optical disk that does not affect the color of the layer on the optical disk.

* * * * *